United States Patent [19]
Peirent

[11] Patent Number: 4,733,351
[45] Date of Patent: Mar. 22, 1988

[54] TERMINAL PROTOCOLS

[75] Inventor: Richard J. Peirent, Tewksbury, Mass.

[73] Assignee: Wang Laboratories, Inc., Lowell, Mass.

[21] Appl. No.: 688,120

[22] Filed: Dec. 31, 1984

[51] Int. Cl.⁴ ................................................ G06F 3/14
[52] U.S. Cl. .................................................... 364/200
[58] Field of Search ... 364/200 MS File, 900 MS File; 340/709, 711, 712, 724, 735, 768, 792

[56] References Cited

U.S. PATENT DOCUMENTS

| | | | |
|---|---|---|---|
| 3,564,511 | 2/1971 | Restivo et al. | 364/900 |
| 3,654,620 | 4/1972 | Bartocci | 364/200 |
| 4,090,237 | 5/1978 | Dimmick | 364/200 |
| 4,200,913 | 4/1980 | Kuhar et al. | 364/900 |
| 4,278,973 | 7/1981 | Hughes et al. | 340/721 |
| 4,290,063 | 9/1981 | Traster | 340/723 |
| 4,342,990 | 8/1982 | Traster | 340/724 |
| 4,370,645 | 1/1983 | Cason et al. | 340/709 |
| 4,394,649 | 7/1983 | Suchoff et al. | 340/711 |
| 4,404,554 | 9/1983 | Tweedy, Jr. et al. | 340/750 |
| 4,405,830 | 9/1983 | Foster et al. | 178/30 |
| 4,429,306 | 1/1984 | Macauley et al. | 340/790 |
| 4,445,194 | 4/1984 | Cason et al. | 364/900 |
| 4,574,362 | 3/1986 | Spindel et al. | 364/900 |
| 4,586,035 | 4/1986 | Baker et al. | 340/712 |
| 4,613,856 | 9/1986 | Olin et al. | 340/723 |

OTHER PUBLICATIONS

Motorola, Inc., MC68020 32-Bit Microprocessor User's Manual, 1984, pp. B-22-B-23.
International Standard 6429, International Organization for Standardization, 1983, Ref. No. 150 6429-1983(E), 8.2.69.

*Primary Examiner*—Gareth D. Shaw
*Assistant Examiner*—Kevin A. Kriess
*Attorney, Agent, or Firm*—Michael H. Shanahan; Gordon E. Nelson

[57] ABSTRACT

Protocols for communicating between a digital data processing system and a terminal. The terminal permits specification of attributes for characters, of fill characters and their attributes, of key board bit maps, and of different modes of specifying a group of shifted characters. The protocols include a protocol which takes another as an operand and specifies how the second protocol is to be executed, protocols which control the use of fill characters, a protocol which resets the attributes of a string of characters, protocols for shifting fields to the left and right and scrolling regions up and down, protocols which save and restore the current cursor state, protocols for loading bit maps and checking their correctness, a protocol for setting the current mode of specifying shifted characters, a protocol for setting the high bit of a following code, and a protocol for obtaining the attribute of the character at the current cursor position. There is also disclosed a new form of terminal to data processing system protocol.

4 Claims, 15 Drawing Figures

TERMINAL IN A DATA PROCESSING SYSTEM

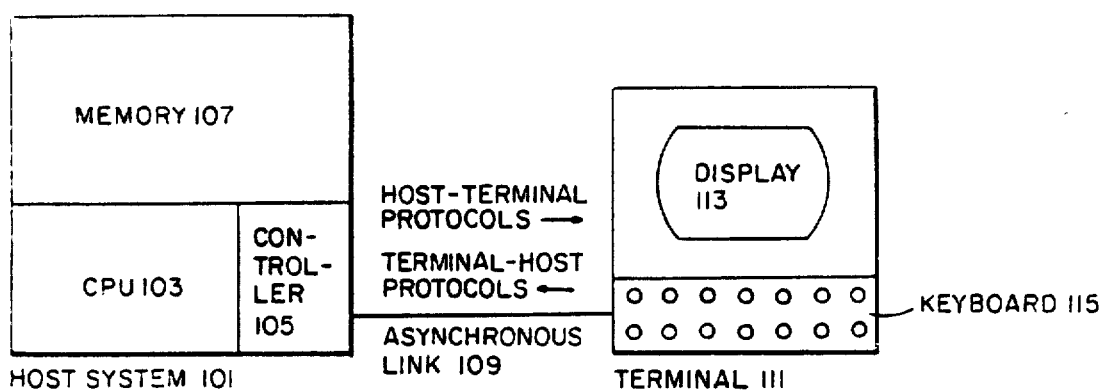
FIG. 1: TERMINAL IN A DATA PROCESSING SYSTEM
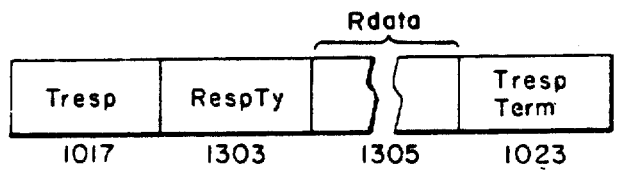
GENERAL FORM OF RESPONSE PROTOCOL 1301
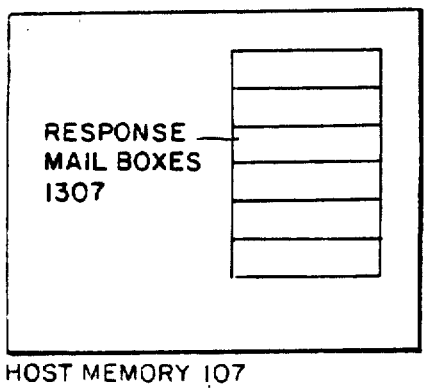
FIG. 13
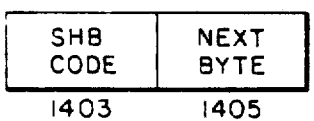
SET HIGH BIT PROTOCOL 1401
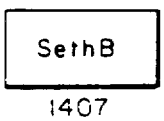
FIG. 14: THE SHIFT HIGH BIT PROTOCOL

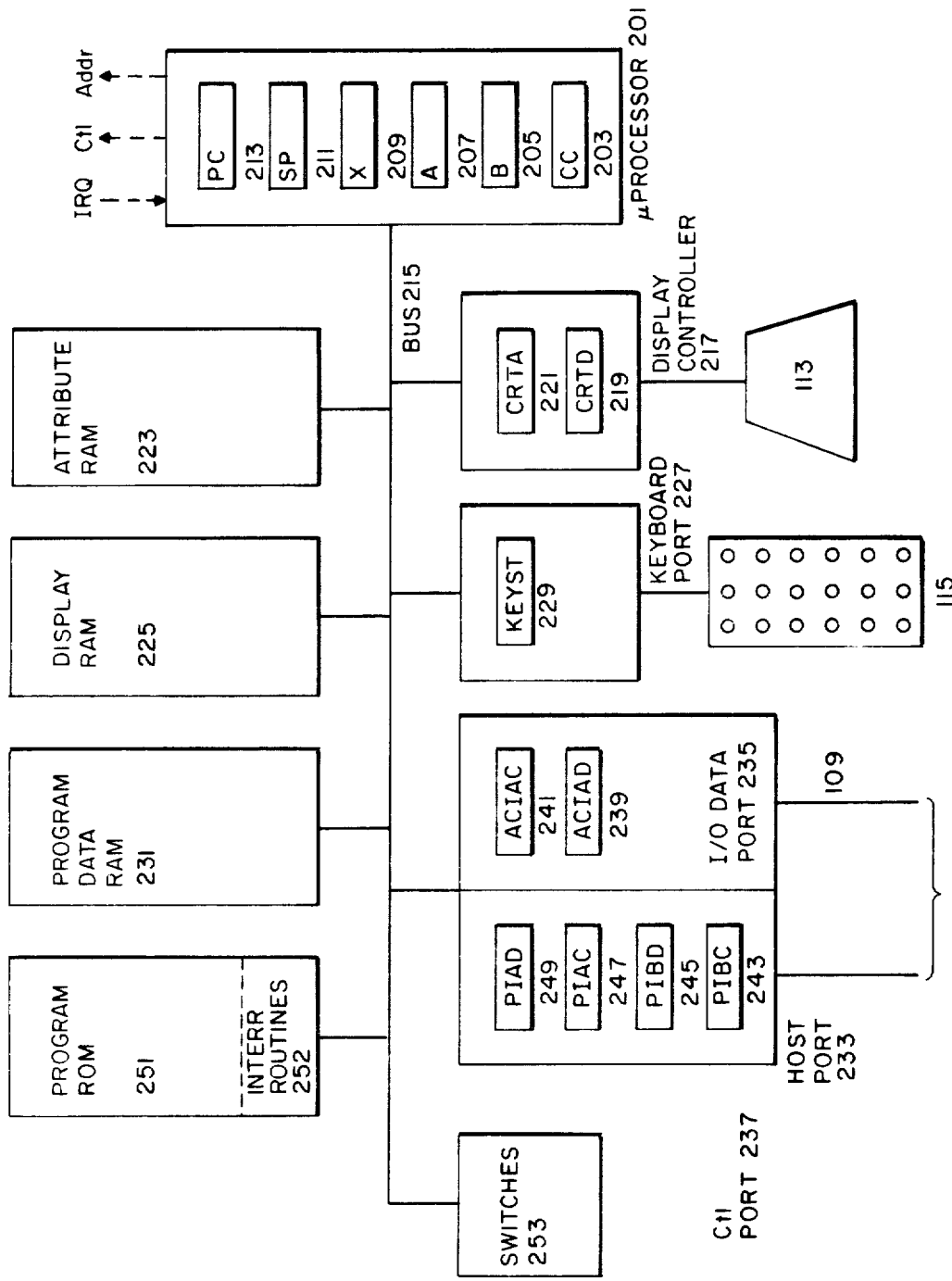
FIG. 2: TERMINAL III BLOCK DIAGRAM

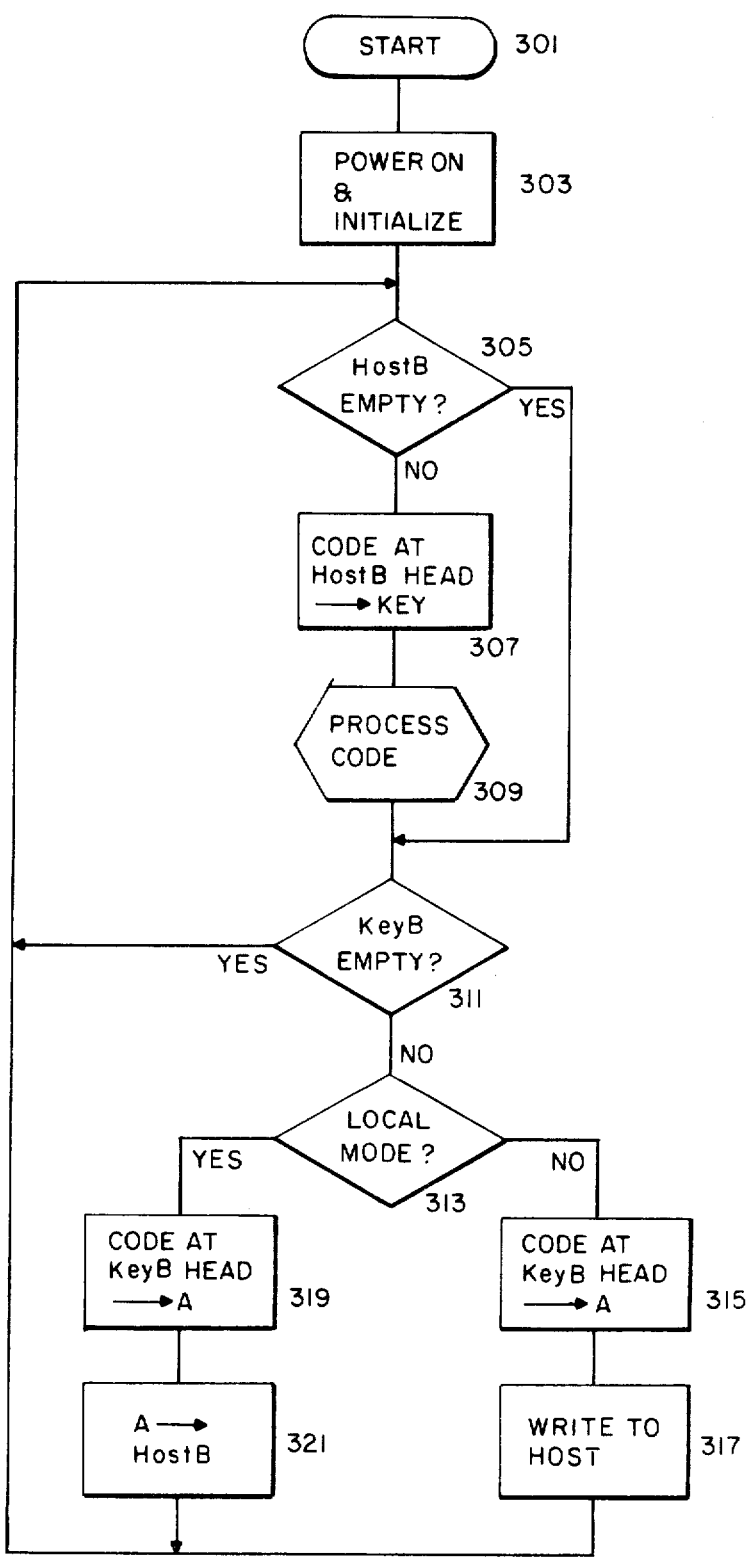
FIG. 3 : MAIN PROCESSING LOOP

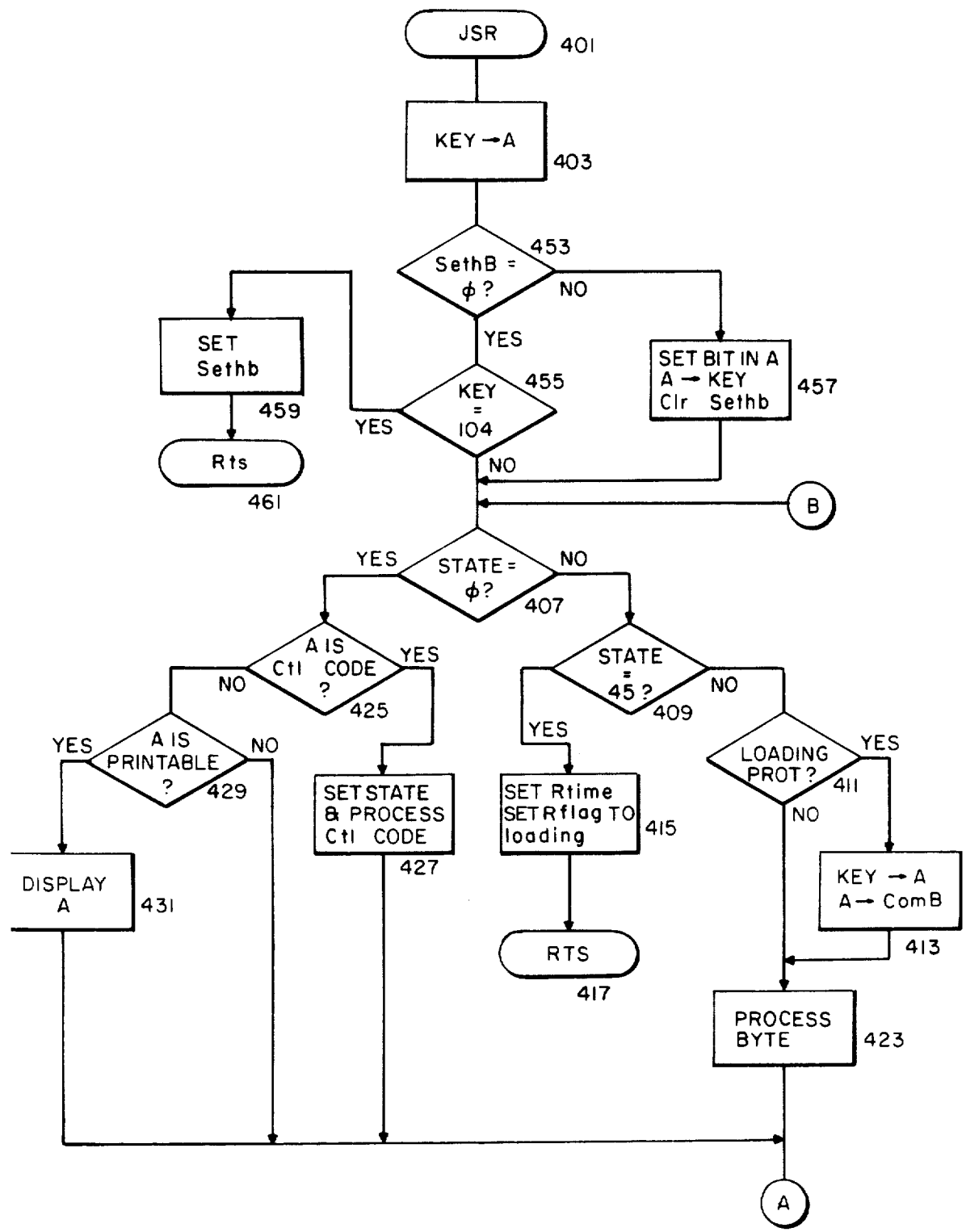
FIG. 4A: DETAIL OF PROCESS CODE 309

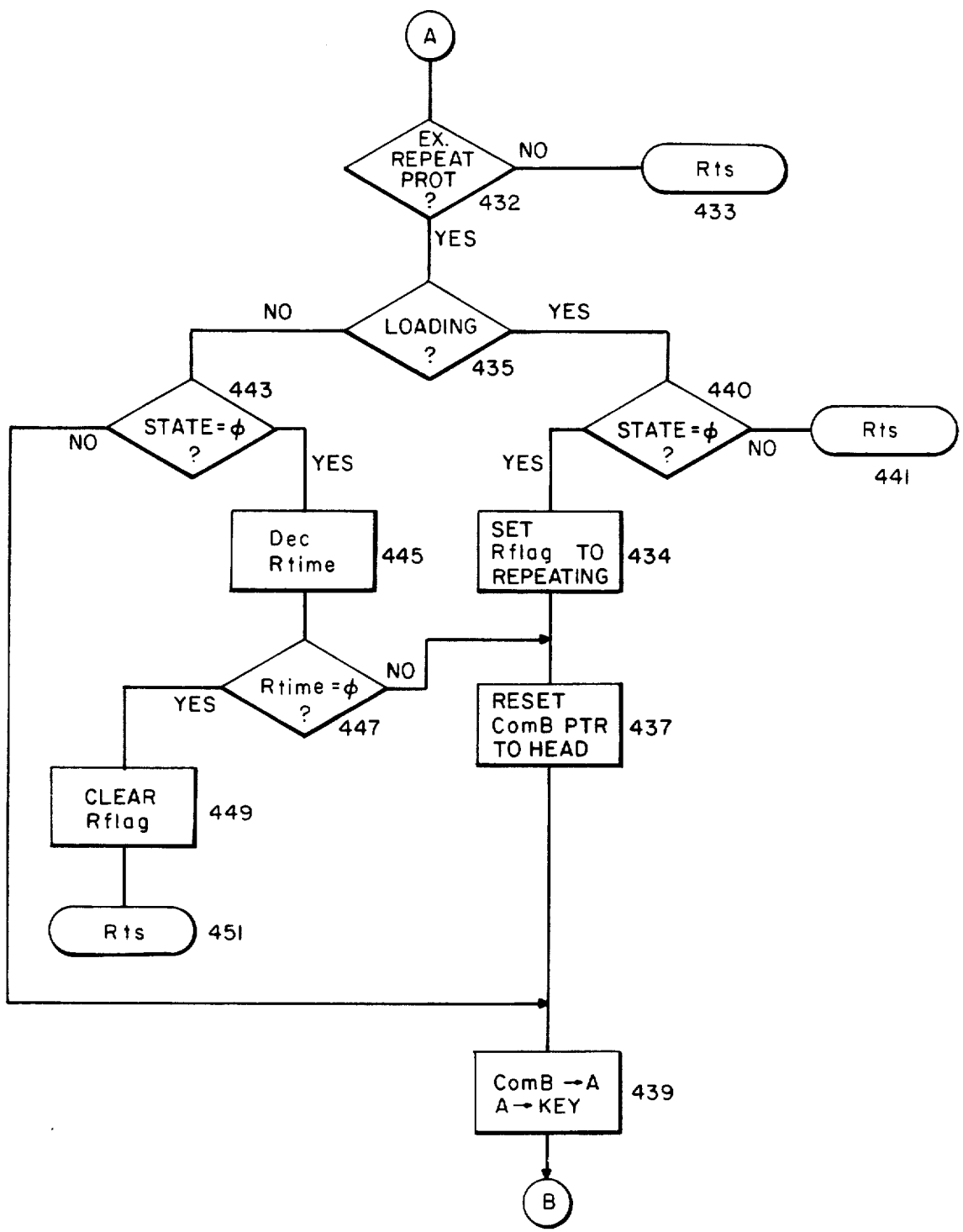
FIG. 4B: DETAIL OF PROCESS CODE 309

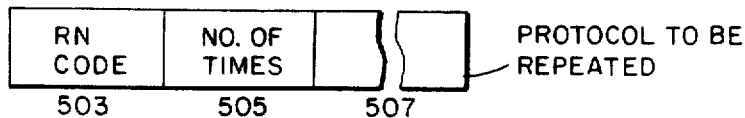
501 REPEAT NEXT PROTOCOL
FIG. 5: REPEAT NEXT PROTOCOL
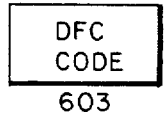
DISPLAY FILL CHARACTER 601
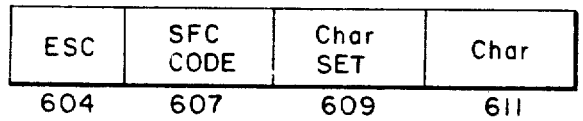
SET FILL CHARACTER 605
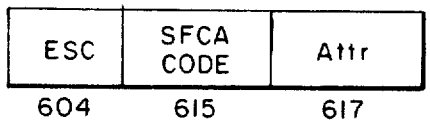
SET FILL CHARACTER ATTRIBUTES 613
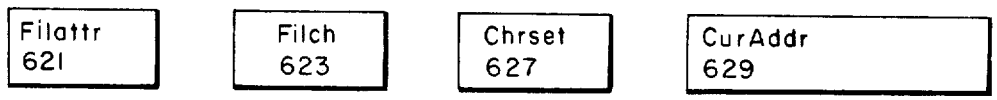
619 VARIABLES IN RAM 231 USED FOR PROTOCOLS 601, 605, 613
FIG. 6: FILL CHARACTER PROTOCOLS

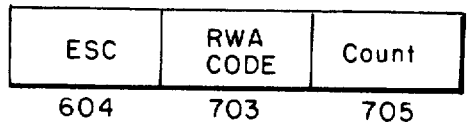
REWRITE ATTRIBUTE PROTOCOL 701
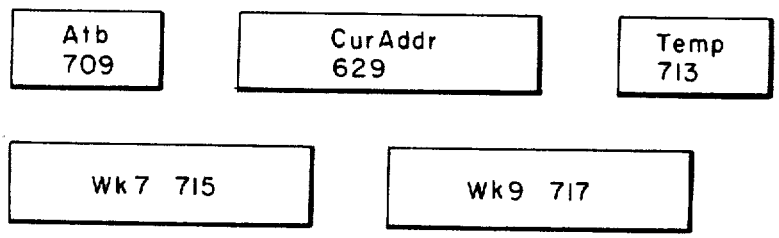
707 VARIABLES IN RAM 231 USED FOR PROTOCOL 701
FIG. 7: REWRITE ATTRIBUTE PROTOCOL
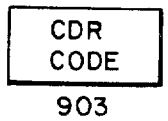
CURSOR DISPLAY RECALL 901
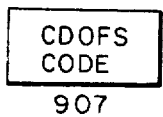
CURSOR DISPLAY OFF AND SAVE 905
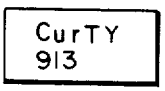
909 VARIABLES IN RAM 231 USED WITH PROTOCOLS 903 AND 907
FIG. 9: CURSOR DISPLAY PROTOCOLS AND VARIABLES

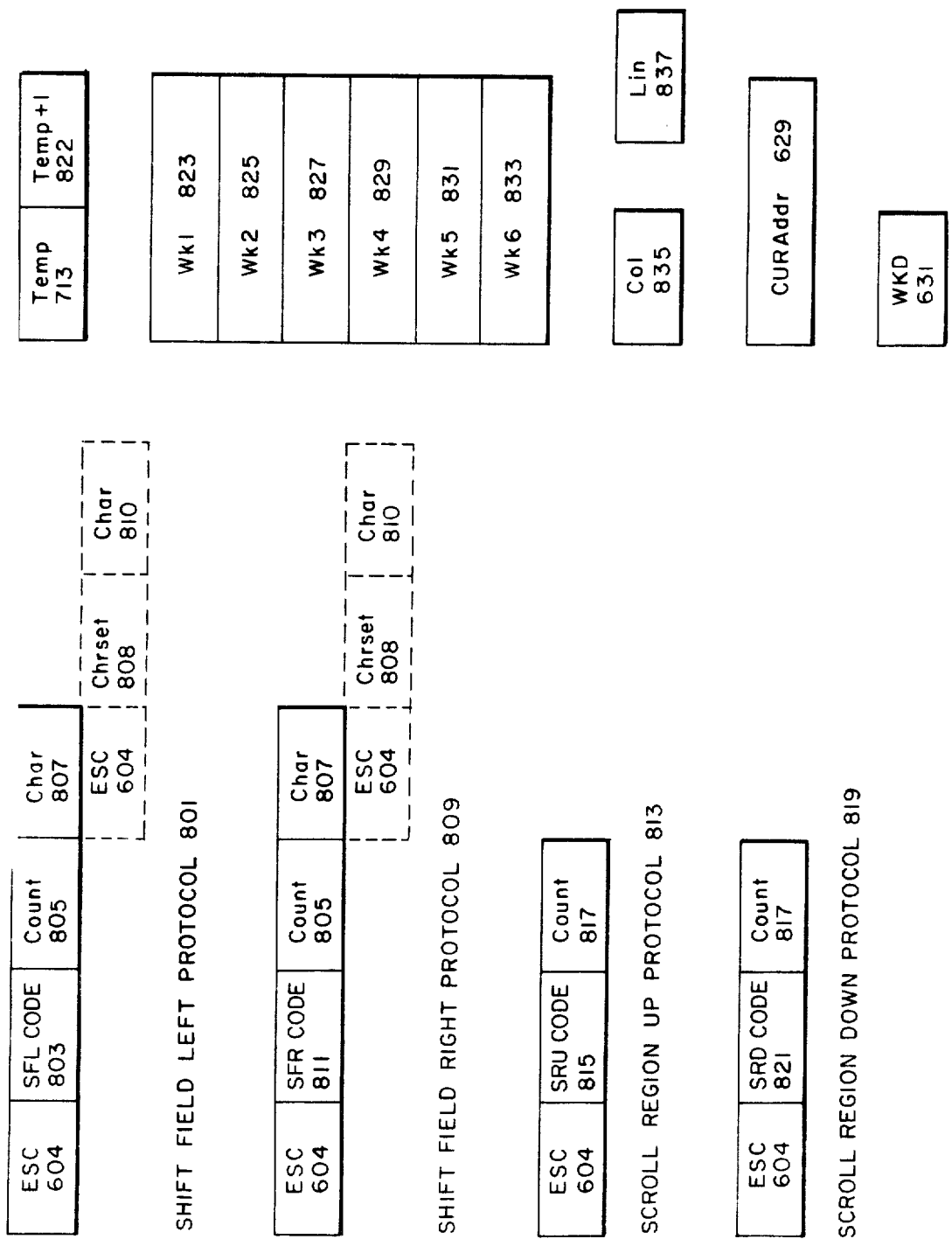
FIG. 8: FIELD AND REGION SHIFTING PROTOCOLS AND VARIABLES

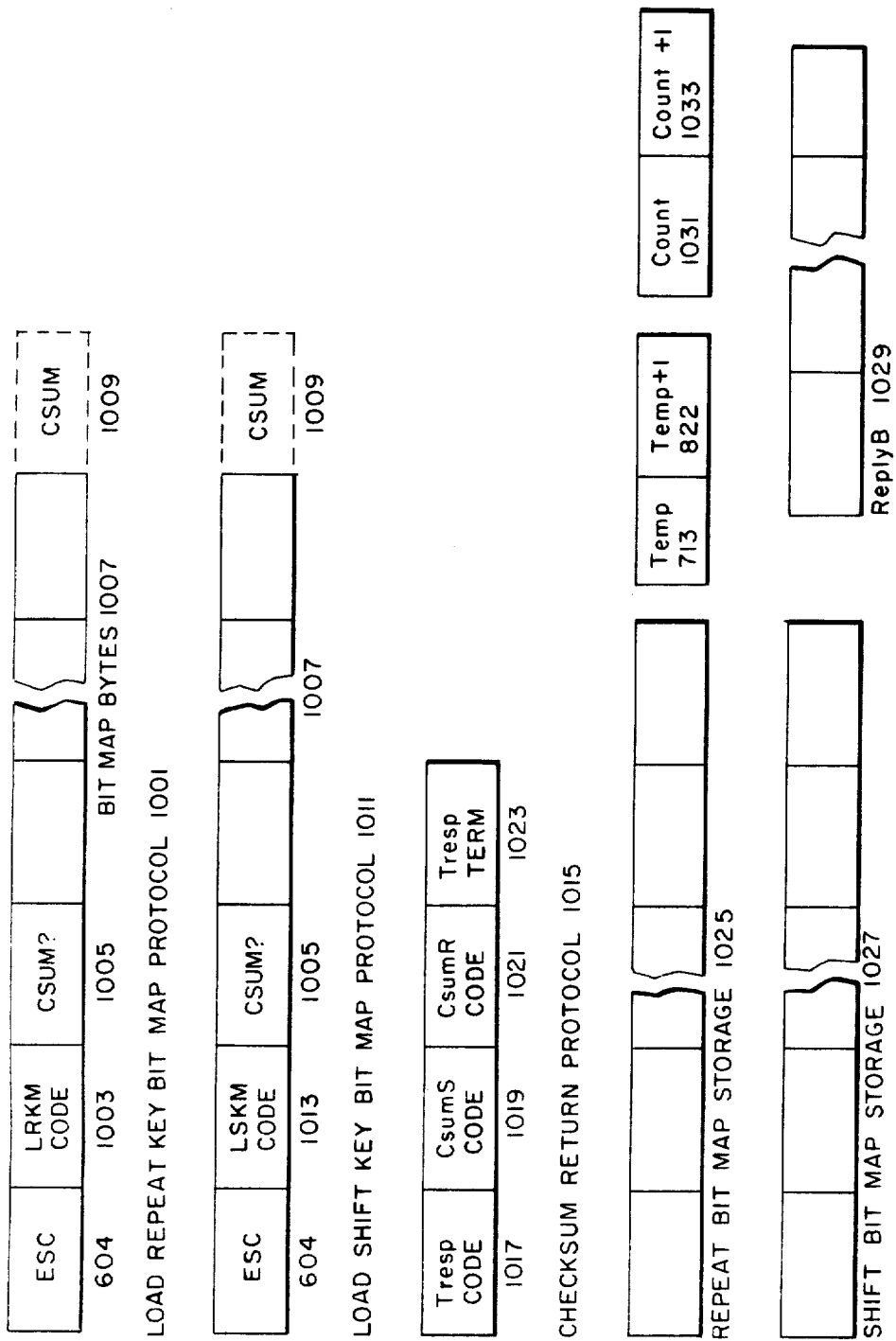
FIG. 10: KEY BIT MAP LOADING PROTOCOLS

| ESC | STC CODE | SLH CODE | LHT CODE |
|---|---|---|---|
| 604 | 1103 | 1105 | 1106 |

SET LOCK KEY HANDLING MODE PROTOCOL 1101

| LokTy 1107 | ShiftF 1109 |
|---|---|

FIG. 11: SET SHIFT LOCK MODE PROTOCOL

| ESC | Qcode | RTA code |
|---|---|---|
| 604 | 1203 | 1205 |

READ TERMINAL ATTRIBUTE PROTOCOL 1201

| TResp code | CurA code | Attr code | Tresp TERM |
|---|---|---|---|
| 1017 | 1209 | 1211 | 1023 |

ATTRIBUTE RETURN PROTOCOL 1207

| Lin 837 | Col 835 |
|---|---|

VARIABLES USED FOR READ TERMINAL ATTRIBUTE

FIG. 12: READ TERMINAL ATTRIBUTE PROTOCOL

TERMINAL PROTOCOLS

BACKGROUND OF THE INVENTION

1. Field of the Invention

The present invention relates to terminals and other apparatus attached to data processing systems and more particularly to protocols used for communicating between a terminal and a data processing system.

2. Description of the Prior Art

Digital data processing systems are frequently connected to data input or display devices by means of asynchronous links over which data is transmitted as a series of sequential codes. Communication between the input or display device and the digital data processing system is achieved by means of protocols, sequences of codes to which the devices or the data processing system respond in a predetermined fashion. Prior-art protocols have defined rather simple operations, for example, the display of a character or the movement of the cursor. While such operations did serve their purpose, some desirable operations could not be specified and others could be carried out only by means of a long and complex series of protocols.

As interactive computing has become popular, the need for more powerful protocols has become apparent. Such protocols increase the productivity of programmers by decreasing the complexity of dealing with terminals, and they increase the efficiency of systems using them by decreasing the number of protocols which must be sent between the data processing system and the input or display device.

SUMMARY OF THE INVENTION

The present invention relates to protocols for communication between a data processing system and devices attached thereto and more specifically to protocols used with a video display terminal. In the video display terminal in which the present invention is employed, each character displayed on the terminal has associated with it a settable attribute specifying the manner in which the character is to be displayed. The terminal is highly flexible in other regards as well: any character displayable on the terminal may be specified as the fill character, i.e., as the character used in the terminal to represent places where there are no other characters. Further, the terminal may employ three different ways of specifying whether a character should be shifted, and finally, the terminal employs bit maps to control the behavior of certain keys.

The present invention includes protocols which permit the digital data processing system using the terminal to take advantage of the terminal's flexibility and protocols which simplify formerly-complex operations. Among the protocols are the following:

- a protocol which takes another protocol as an operand and specifies the manner in which the second protocol is to be executed.
- a group of protocols which permit the data processing system to specify a fill character and its attribute and to specify that the current fill character be displayed with its attribute.
- a protocol which resets the attributes of a sequence of characters to a current attribute.
- protocols which shift a sequence of characters to the left or the right one position and insert a specified character in the open position.
- protocols which scroll a region of the display up or down one line and insert a blank line in the open line.
- protocols which save and restore the current state of the cursor.
- protocols which load bit maps and confirm that the loaded bit map is correct.
- a protocol which determines which mode is to be used to indicate that a character has been shifted.
- a protocol to which the terminal responds by returning the attribute associated with the character at the current cursor postion.
- a new form of protocol for use in transferring information from the terminal to the data processing system.
- a protocol to which the terminal responds by setting the high bit of the byte containing the following code.

It is thus an object of the invention to provide an improved data processing system.

It is another object of the invention to provide improved protocols for use in communicating between a data processing system and input-output devices.

It is an additional object of the invention to provide a protocol which may take another protocol as an operand.

It is a further object of the invention to provide protocols which permit selection of a fill character and its attributes.

It is still another object of the invention to provide protocols which can reset the attributes associated with a sequence of characters and can read the attributes of a character at the current cursor position.

It is a still further object of the invention to provide protocols which permit fields to be shifted to the left and right and regions to be shifted up and down.

It is a further additional object of the invention to provide protocols which retain and restore cursor state.

It is yet another object of the invention to provide protocols which set terminal bit maps.

It is a still further additional object of the invention to provide a protocol which determines how the terminal specifies that a character be shifted.

It is a yet further object of the invention to provide terminal-to-data processing system protocols having forms particularly suited to efficient processing in the data processing system.

Other objects and advantages of the present invention will be understood by those of ordinary skill in the art after referring to the detailed description of a preferred embodiment contained herein and to the drawings, wherein:

BRIEF DESCRIPTION OF DRAWINGS

FIG. 1 is a block diagram prepresentation of a data processing system including a terminal in which the present invention is employed.

FIG. 2 is a detailed block diagram of the terminal of FIG. 1

FIG. 3 is a flow chart showing the main processing loop executed by the terminal of FIG. 2.

FIGS. 4A and 4B are a flow chart showing a detail of the process character block of the flow chart of FIG. 3.

FIG. 5 is a diagram showing the repeat next protocol and the variables used to implement it in a present embodiment.

FIG. 6 is a diagram showing the fill character protocols and the variables used to implement them in a present embodiment.

FIG. 7 is a diagram showing the rewrite attributes protocol and the variables used to implement it in a present embodiment.

FIG. 8 is a diagram showing the field and region shifting protocols and the variables used to implement them in a present embodiment.

FIG. 9 is a diagram showing the cursor state save and restore protocols and the variables used to implement them in a present embodiment.

FIG. 10 is a diagram showing the bit map loading protocols and the variables used to implement them in a present embodiment.

FIG. 11 is a diagram showing the set shift lock mode protocol and the variables used to implement it in a present embodiment.

FIG. 12 is a diagram showing the read terminal attribute protocols and the variables used to implement them in a present embodiment.

FIG. 13 is a diagram showing the general form of the terminal response protocols.

FIG. 14 is a diagram showing the set high bit protocol and the variable used to implement it in a present embodiment.

Reference numbers in the figures have three or more digits. The two least significant digits are reference numbers within a drawing; the more significant digits are the drawing number. For example, the reference number 901 refers to an item shown in FIG. 9.

DESCRIPTION OF A PREFERRED EMBODIMENT

The following discussion of a preferred embodiment of the present invention will begin with an overview of data processing systems using terminals, continue with a discussion of a terminal in which the present invention is embodied, proceed to a detailed presentation of how the terminal handles the codes it processes, and conclude with detailed discussions of the individual protocols.

1. Overview of a Data Processing System with Terminal: FIG. 1

FIG. 1 presents an overview of a data processing system using a terminal. The system has two major components, host system 101 and terminal 111. Host 101 and terminal 111 are connected by asynchronous link 109. Host 101 receives data from and provides data to terminal 111 via asynchronous link 109. Asynchronous link 109 transfers the data as a series of code sequences. In a present embodiment, each code sequence consists at least of a start bit, a sequence of code bits, and a stop bit. The code may contain 7 or 8 bits. Additionally, the code sequence may contain a parity bit and/or a second stop bit. The code sequences sent between host 101 and terminal 111 form protocols. Sequences sent from host 101 to terminal 111 make up host-terminal protocols. By means of these protocols, host 101 provides data to and controls operation of terminal 111. Sequences sent from terminal 111 to host 101 make up terminal-host protocols, by means of which terminal 111 provides data and status information to host 101.

Host system 101 includes memory 107 for storing data, CPU 103 for processing data, and controller 105, which operates under control of CPU 103 to provide the protocols required to transfer data to terminal 111 and control operation of terminal 111. In other embodiments, controller 105 may be lacking and CPU 103 may directly provide protocols to terminal 111. Terminal 111 contains keyboard 115, for inputting data to terminal 111, and display 113, for displaying data input from keyboard 111 or received from host system 101.

A typical interaction between host system 101 and terminal 111 is the following: Host system 101 first sends host-terminal protocols to terminal 111 placing terminal 111 into the proper condition to perform the desired operation. Host system 111 then sends protocols representing text characters to terminal 111. The text characters appear on display 113 in the manner specified by the protocols used to put terminal 111 into the desired condition. Host system 101 then sends a protocol which moves a cursor on display 113 to a position at which the user of terminal 111 is to provide input. The user then employs keyboard 115 to input data to terminal 111, which transmits terminal-to host protocols via asynchronous link 109 to host system 101. Host system 101 may respond to the input provided from the user in the manner just described, and the user may then provide further input as required by host system 101. In general, the terminal-host protocols specify text characters but, some protocols specify modifications in following characters and others return information concerning the status of the terminal.

2. A Terminal Responsive to Protocols of the Present Invention: FIG. 2.

FIG. 2 presents a block diagram of a terminal 111 responsive to the protocols of the present invention. Operation of terminal 111 is controlled by microprocessor 201. In a present embodiment, microprocessor 201 is a Motorola MC68B00, manufactured by Motorola, Inc. In other embodiments, other microprocessors may be employed. Microprocessor 211 is connected via bus 215 to the remaining components of terminal 111 and can provide data to and receive data from these components via bus 215. The other components include memory and devices for sending, receiving, and displaying data. The memory includes the following:

- Display RAM (random access memory 225 for storing codes of characters to be displayed on display 113.
- Attribute RAM 223 for storing attribute codes how the characters in display RAM 225 are to be displayed in display 113. Attributes in a present embodiment include blinking, reverse video, high intensity, and underlining.
- Program data RAM 231 for storing data used in internal operation of terminal 111.
- Program ROM (read only memory) 251, containing the programs executed by microprocessor 201 while controlling operation of terminal 111.

The other devices are the following;

- Switches 253 are switches set by a user of terminal 111 to specify certain options;
- Host port 233 is connected to asynchronous link 109 and has two components: IO data port 235 for receiving data from and providing data to host 101 and control port 237 for receiving control signals from host 101 and other devices in terminal 213 and providing control signals to host 101 via link 109;
- Keyboard port 227 is connected to keyboard 115 and receives key codes from keyboard 115;
- Display controller 217 is connected to display 113 and controls operation of display 113.

Microprocessor 201 can address RAMs 223, 225, and 231, ROM 251, and registers in host port 233, keyboard port 229, and display controller 217. The registers have the following contents:

In control port 237, there are two pairs of registers, PIAD 249 and PIAC 247, and PIBD 245 and PIBC 243. The D register of each pair contains data used in conjunction with a control signal; the A register contains a control code.

In I/O data port 235, there are two registers: ACIAC 241, which contains a control code, and ACIAD 239, which contains data received in or to be sent from I/0 data port 235.

In keyboard port 227, there is a single register, Keyst 229, which contains the keystroke last input to keyboard 115.

In display controller 217, there are two registers, CRTA 221, which contains an address in display 113, and CRTD 219, which contains data to be displayed at that address.

Microprocessor 201 can further address switches 253 and read the current settings of the switches. Any data addressable by microprocessor 201 may be read from its location into one of microprocessor 201's internal registers; if the data at a location is writable, data may be read from one of microprocessor 201's internal registers to the location. Programs for microprocessor 201 may further specify arithmetic and logical operations on data contained in its internal registers. The registers have the following contents:

PC 213 contains the address of the instruction which microprocessor 201 is currently executing.

SP 211 contains the location of the top of a data stack in program data RAM 231.

X 209 contains an address used to calculate the address of data.

A 207 and B 205 contain operands for use in arithmetic-logical operations.

CC 203 contains bits indicating the internal condition of microprocessor 201 after certain operations.

In addition to receiving and outputting data via bus 215, microprocessor 201 produces addresses and control signals for the devices connected to bus 215 and responds to interrupt requests from host port 233. The interrupt requests are generated by host port 233 when terminal 111 receives data or control signals from host system 101, when it receives a keystroke from keyboard 115, or when it must renew the display on display 113. When microprocessor 201 receives an interrupt request, it interrupts the execution of the program it is currently executing, saves the current contents of its registers on the stack, and executes interrupt routines 252 from program ROM 251; when the interrupt routines are finished, microprocessor 201 restores the saved state and resumes execution of the program it was executing when the interrupt occurred.

Thus, under control of a program from program ROM 251, microprocessor 201 may fetch data from one device in terminal 111, perform an operation on it, and store the result of the operation in another device in terminal 111. When the data is values for the registers of control port 237, I/0 data port 235, or display controller 217, these devices may respond by outputting data or control signals to host 101 or to display 113.

3. General Mode of Operation of Terminal 111: FIG. 3

The flow chart of FIG. 3 shows the general mode of operation of terminal 111. The flow chart, as is generally the case with flow charts and descriptions of operations disclosed herein has been simplified to include only those operations relevant to the present invention. For example, all input-checking operations have been omitted from the flow charts and discussions.

As shown in FIG. 3, when terminal 111 is turned on, microprocessor 201 executes the operations represented by block 303. In the course of these operations, microprocessor 201 checks the status of the components of terminal 111 and initializes RAMs 231, 225, and 223 and the registers in control port 237, I/0 data port 239, and display controller 217 to the proper values for commencement of operation. Microprocessor 201 then begins executing a main processing loop. Execution of the loop continues until terminal 111 is turned off.

Each time microprocessor 201 executes the loop, it examines an area in program data RAM 231 which is used as a queue for storing bytes of data to which terminal 111 must respond. In the following, that queue will be referred to as HostB. As represented in decision block 305 of FIG. 3, if HostB is not empty, microprocessor 201 executes blocks 307 and 309. As indicated in block 307, microprocessor 201 takes the byte at the head of HostB, copies it into a register in microprocessor 201 and from there to a variable in program data RAM 231 which we shall term Key, and updates the head pointer for HostB so that the next byte in the queue is now the head of the queue. The byte is then processed as required by the protocol which terminal 111 is currently executing.

If HostB is empty, microprocessor 201 checks a second queue in program data RAM 231 which will be called in the following KeyB. KeyB contains keystrokes received from keyboard 115. As represented in decision block 311, if there is no data in KeyB, microprocessor 201 again checks whether there is data in HostB. If there is data. microprocessor 201 checks a variable in RAM 231 which indicates whether the terminal is in local mode or is transmitting characters to host 101. When the terminal is in local mode, it responds directly to input from keyboard 115 and does not transmit that input to host 101. Decision block 313 shows that in the former case, blocks 319 and 321 are executed. The operation represented by block 319 copies the code at the head of KeyB into register A 207 and updates the head pointer for KeyB so that the next byte in the queue is now the head. The operation represented by block 321 writes the value of register A 207 to the tail of HostB 321. Microprocessor 201 then returns to the beginning of the loop, and will consequently eventually process the code received from keyboard 115. If the terminal is not in local mode, blocks 315 and 317 are executed. The effect of those operations is to output the character received from the keyboard to host 101. After outputting the character, microprocessor 201 again returns to the beginning of the loop.

Execution of the main loop is interrupted whenever input from host 101 arrives at I/0 data port 235, a keystroke arrives in keyboard port 227 from keyboard 115, or display 113 must be refreshed. In each of these cases, the result of the occurrence is the production of an interrupt request signal. As previously mentioned, microprocessor 201 responds to the interrupt request signal by saving the state of its internal registers in the data stack in RAM 231 and executing an interrupt routine in interrupt routines 252. That routine examines the internal registers in the devices to determine which one caused the interrupt and why there was an interrupt. It then executes the proper routine in interrupt routines 252 for dealing with that type of interrupt. When the interrupt routine is finished, the saved state is restored and execution of the main processing loop continues.

When the interrupt occurred because a code was received from host 101, the interrupt routine stores the code received in ACIAD 239 at the tail of HostB; in the case of 7-bit codes, the high bit of the byte stored in HostB is set to 0. When the interrupt occurred because a code was received from keyboard 115, the interrupt routine stores the code received in Keyst 229 at the tail of KeyB. As previously explained, execution of the main processing loop eventually results in the processing of the code in process code block 309. When the interrupt occurred because display 113 must be refreshed, microprocessor 201 executes a routine which outputs the contents of display RAM 225 and attribute RAM 223 to display controller 217. What actually appears on display 113 depends on the character code stored in display RAM 225, the attributes corresponding to the character in attribute RAM 223, and the character set which is currently being used in terminal 111.

The manner in which a character code is received from host 101 and displayed on display 113 provides a general example of the operation of terminal 111. The character code arrives via asynchronous link 109 in I/0 data port 235 and is stored in ACIAD 239. On arrival of the character code, I/0 data port 235 generates an interrupt request. As a result of the interrupt request, microprocessor 201 executes an interrupt routine which places the character code at the tail of HostB. On return from the interrupt, microprocessor 201 continues executing the main loop, and eventually processes the character code. In this case, the only action to be taken is the display of the character on display 113, so the processing of block 309 is merely a matter of writing the character and its attributes to the proper locations in display RAM 225 and attribute RAM 223. When the main loop is next interrupted to refresh display 113, the contents of RAM 225 are displayed, and consequently, the character corresponding to the character code is displayed.

4. Processing Protocols in Terminal 111: FIG. 4

As previously mentioned, data and control information are transferred between host 101 and terminal 111 in the form of protocols. In a present embodiment, the data and control information in a protocol forms a sequence of one or more 7 or 8 bit codes. Within a given protocol, all codes are either 7 or 8 bits. The codes are processed in the order in which they are received in terminal 111. The first code is interpreted as indicating what action the terminal is to perform. If there is more than one code, the remaining codes contain information needed to perform the action specified by the first code.

When a protocol contains only a single code, terminal 111 simply receives the code and performs the action specified by the code. Examples of such single code protocols are the protocols for the displayable characters. Each protocol contains a single character code. As previously described, terminal 111 responds to the character code by displaying the specified character on display 113. When a protocol contains more than 1 code, terminal 111 receives the first code, performs whatever processing is required, and sets a variable in RAM 231 which will be called State herein to a value which indicates the kind of operation specified by the first code. Terminal 111 then receives the second code and processes it as required by the value of the code and the value of State. If there are further codes, the processing for each code will be governed by the value of the code and the value of State and will include setting State to a new value. When the last code is processed, State will be reset to 0.

A detailed flowchart of protocol processing in a present embodiment is provided by FIGS. 4A and 4B. The flowchart in these figures represents the processing which occurs in process code block 309 of the main processing loop represented by FIG. 3. The processing is performed in a subroutine, and consequently, processing begins with a JSR (jump to subroutine) instruction in the main loop (terminal 401). Microprocessor 201 executes a JSR instruction by saving the address of the instruction following the JSR on the data stack in RAM 231 and setting PC 213 to the address of the first instruction in the subroutine, so that the next instruction to be executed is the first instruction in the subroutine.

The first step performed by microprocessor 201 under control of the subroutine is storing the byte of code currently being processed, contained in the variable Key, in register A 207 of microprocessor 201. Next, microprocessor 201 performs processing necessary to convert certain codes from 7 to 8 bits. As will be explained in more detail later, such codes are preceded by a conversion code. In a present embodiment, that code has the value 04. As may be seen from decision block 455 and block 459, microprocessor 201 responds to the conversion code by setting a variable called Sethb and executing a RTS instruction (terminal 461) which restores the state which was saved by the JSR instruction (terminal 401) so that the operation in the main loop following block 309 is performed. When the code following the conversion code is received, Sethb is not equal to 0, and as shown in decision block 455 and block 457, in that case, the eighth bit is set in A and in Key and Sethb is cleared.

Microprocessor 201 next determines whether the variable State=0 (decision block 407). If it does, the code in register A 207 is the first byte of a protocol. The first byte is either a control code or some other kind of character (most likely a printable character). As shown by decision block 425, if it is the former, microprocessor 201 sets the variable State (block 427) and does whatever processing is required for that control code; if it is the latter, microprocessor 201 determines whether it is printable (decision block 429) and stores the character and its attributes at the proper locations in display RAM 225 and attribute RAM 223 so that the character will be displayed on display 113 the next time display 113 is refreshed. The proper locations in RAMs 225 and 223 are determined from variables in RAM 231 which contain the current address in display RAM 225 and the current attributes. In a present embodiment, the address of the attributes in attribute RAM 223 for a given character in display RAM 225 is at a constant offset from the address of the character in display RAM 225, and consequently may be computed by adding the offset to the address of the character in display RAM 225. If the character is neither printable nor a control code, microprocessor 201 simply proceeds to block 432 (FIG. 4B).

If State does not equal 0 (decision block 407), microprocessor 201 next determines whether State=45 (decision block 409). In this case, what is being processed is the second byte of a repeat next protocol. As will be explained in detail later, that protocol specifies that a following protocol be repeated the number of times specified in the second byte of the repeat next protocol. If the second byte of a repeat next protocol is being processed, processor 201 sets the variable Rtime from the second byte so that the following protocol will be repeated the specified number of times and sets the variable Rflag to indicate that the protocol to be repeated is to be loaded into the variable ComB in RAM 231 (block 415). Then processor 201 executes a RTS instruction (terminal 417), which ends the processing in block 309.

If what is being processed is not the second byte of a repeat next protocol, microprocessor 201 determines from the value of Rflag whether the code is part of a protocol whch is being saved to be repeated as specified by the repeat next protocol (block 411). If it is, the unshifted code is again moved from the variable Key to register A 207 and from thence to the tail of the queue in ComB (block 413). Whether the code byte is stored in ComB or not, it is then processed as required by its value and the current value of State (block 423), i.e., as required by the protocol to which the code belongs.

The next step is decision block 432 (FIG. 4B). If microprocessor 201 is not executing the repeat next protocol, it executes a Rts instruction (terminal 433), thereby ending execution of process code block 309. If it is executing the repeat next protocol and has already processed the second byte of that protocol as described above, it is either loading the protocol to be repeated into ComB or executing the protocol to be repeated from ComB (decision block 435).

If microprocessor 201 is loading and State does not=0 (decision block 440), bytes of the command remain to be fetched from HostB and microprocessor 201 executes an Rts instruction ending the execution of process code block 309 for the byte just processed (terminal 441). If State does=0, all of the bytes of the protocol to be repeated have been received and the loading operation performed in block 413 is finished. In this case, microprocessor 201 sets the variable Rflag to indicate that the loaded protocol is now being repeated (block 434) and resets a pointer, called herein BuffP, which indicates the byte to be next read from ComB to point to the first byte of the loaded protocol. When that is done, microprocessor 201 loads the first byte from ComB into the variable Key and branches to block 407 (FIG. 4A). Thus, the next byte to be processed in process code block 409 will be the first byte in ComB.

Continuing with decision block 443, if the protocol to be repeated is not being loaded, it is being repeated. In this case, if State=0 (decision block 443), the current repetition is finished. At the end of each repetition, microprocessor 201 decrements the variable Rtime (block 445). If Rtime does not equal 0, more repetitions remain, so microprocessor 201 branches to block 437 to set up the next repetition. If Rtime does equal 0, all repetitions are finished, so microprocessor 201 clears the variable Rflag (block 449) and executes a return instruction, ending execution of process code block 309 (terminal 451). If State does not=0 (decision block 443), the microprocessor increments BuffP to ComB to point to the next byte of the stored command, fetches that byte (block 439), and branches to decision block 407 (FIG. 4A). As previously pointed out, the byte fetched from ComB will be the next code to be processed.

5. Detailed Discussion of Certain Protocols

In the following, certain protocols responded to or produced by Terminal 111 will be described in detail. A figure will show the form in a present embodiment of each protocol. Each description will explain the protocol's form, function, and implementation in a present embodiment. Code values used in a present embodiment will be given in hexidecimal notation. Host to terminal protocols will be described first and then terminal to host protocols.

A. The Repeat Next Protocol: FIG. 5

As indicated in the preceding discussion, terminal 111 responds to a repeat next protocol which specifies that the protocol following the repeat next protocol is to be executed the number of times specified in the repeat next protocol. The value of such a protocol may be seen from the fact that without such a protocol, whenever a series of identical operations are to be specified, a separate protocol for each of the operations must be sent from host system 101 to terminal 111, thereby increasing the amount of traffic on asynchronous link 109 and the amount of time required to perform the operation.

The protocol has the following form in a present embodiment:

RN Code 501: byte containing the repeat next code (X12)

No. of Times 505: byte containing the number of times the next protocol is to be repeated Protocol to be Repeated 507: the bytes of the protocol to be repeated.

In a present embodiment, the protocol is implemented as follows: in response to the repeat next code, the subroutine executed in process code block 309 sets State to 45. In response to byte 2, specifying the number of times the next protocol is to be repeated, and to State=45, the subroutine executed in process code block 309 processes the repeat protocol as specified in block 415. The processing includes setting a variable in RAM 231 which will be called herein Rtime 513 to one less than the value of no. of times 505 and setting the variable Rflag 515 to the value 2, indicating that a protocol to be repeated is to be loaded. Then the subroutine clears ComB 511 and its associated pointer BuffP 517.

The effect of setting Rflag 515 and Rtime 513 is to cause microprocessor 201 to first load protocol to be repeated 507 into ComB 511 and then to execute protocol to be repeated 511 from ComB 511 the number of times specified by no. of times 505. As indicated in the discussion of FIG. 4 above, as long as Rflag 517 has the value 2 and State is not equal to 0 or 45, each byte processed by process code block 309 is loaded into ComB 511 before it is processed and BuffP 517 is updated to point to the following location in ComB 511. After the code is processed, microprocessor 201 determines from the values of State and Rflag 515 whether the loading is finished (decision block 432). If it is, microprocessor 201 decrements Rflag 515 and resets BuffP 517 to point to the first byte of ComB 511. If a protocol is being repeated (decision blocks 432 and 435), the microprocessor determines from the value of State whether the current repetition is finished. If it is not, State will not=0 (decision block 443), so microprocessor 201 branches to block 439 and does the processing necessary to increment BuffP and fetch the next byte of the stored command from ComB (block 439). If the current repetition is finished, microprocessor 201 decrements Rtime 513 (block 445). If Rtime=0, the repetitions are finished, and the microprocessor clears Rflag and returns (blocks 447, 449, 451). Otherwise, the microprocessor resets BuffP 517 to point to the first byte in ComB 511 (block 437) and execution continues with block 439.

As will be clear to those skilled in the art, other implementations of the repeat next protocol are possible.

Further, other protocols which specify an operation to be performed using following protocols are possible. For example, a repeat next protocol might specify a condition instead of a number of repetitions. With such a repeat next protocol, the following protocol would be repeated until the condition was fulfilled. Further versions of the repeat next protocol might permit repetition of a sequence of protocols, either by indicating the number of protocols in a byte in the repeat next protocol or by employing a terminator code to mark the end of the sequence of protocols to be repeated. Another type of such a protocol might be a call protocol. The terminal would respond to such a protocol by saving its current state, executing the sequence of protocols specified in the call protocol, and then restoring the saved state.

B. Fill Character Protocols: FIG. 6

A fill character is a character used in display 113 to represent "white space", i.e., spaces, empty lines, tabs, indentations, and the like. The most common fill character is the one to which display 113 responds by displaying a blank; however, other fill characters may be useful for specific applications. In terminal 111, any character which may be displayed on display 113 may be used as a fill character, and the fill character may have any attribute available for display 113. This flexibility is attained in terminal 111 by means of 3 protocols: display fill character 603, which indicates that the current display character is to be displayed using the attributes currently specified therefor, set fill character 605, which specifies the character to be used as a fill character, and set fill character attributes 613, which specifies the attributes to be used for the current fill character.

i. Display Fill Character 601

Beginning with display fill character 601, that protocol consists of a single byte to which microprocessor 201 responds by displaying the fill character specified by the last set fill character protocol using the attributes specified by the last set fill character attributes protocol. In a present embodiment, DFC code 603 is X1E.

In responding to display fill character 601, microprocessor 201 employs three variables: filattr 621, specifying the attributes currently being used with the fill character, filch 623, indicating the current fill character, and CurAddr 629, specifying the current address in display RAM 225. The current address is that of the character at which the cursor is currently positioned in display 113. The protocol is executed by storing the character specified in filch 623 at the location in display RAM 225 specified by CurAddr 629 and storing the attributes specified in filattr 621 at the location in attribute RAM 223 specified by adding the constant offset used to specify attribute addresses to CurAddr 629. When the contents of display RAM 225 are next displayed, the fill character specified by filch 623 and filattr 621 will appear.

ii. Set Fill Character 605

Set fill character protocol 605 contains four bytes:
ESC code 604, having the value X1B;
SFC code 607, having the value X46;
Char set 609, specifying the character set from which the fill character is to be taken;
Char 611, specifying the fill character.

Microprocessor 201 responds to the protocol as follows: in response to ESC 604, it sets State to 1; in response to State=1 and SFC code 607, it sets State to 11; in response to that value of State and char set 609, microprocessor 201 sets the variable Chrset 627 to a value representing the character set specified by chr set 609 and sets State to 12; in response to that value of State and char 611, it sets filch 623 to a value representing the character specified in char 611, thus completing the operation. When terminal 111 next receives a display fill character protocol 601, it will display the fill character defined by Chrset 627 and filch 623.

iii. Set Fill Character Attributes 613

Set fill character attributes protocol 612 contains three bytes in a present embodiment:
ESC code 604,
SFCA code 615, having the value X41.
Attr 617, specifying the attributes. In a present embodiment, Attr 617 specifies the four attributes by means of the four least significant bits. When the least significant bit is set, it specifies blink; the next specifies intensity; the following specifies underline, and the last specifies reverse video.

Microprocessor 201 responds to ESC code 604 by setting State to 1; it responds to State=1 and SFCA code 615 by setting State to 6; it responds to attr 617 and State=6 by setting filattr 621 to a value which specifies the attribute represented by attr 617. On receipt of the next display fill character 601, display 113 will display the current fill character with the attributes specfied in attr 617.

Variations on the above protocols are possible. For example. in a terminal which had only a single character set, there would be no need to specify the character set in set fill character. Other ways of implementing the protocols will also be clear to those skilled in the art.

C. The Rewrite Attribute Protocol: FIG. 7

The rewrite attribute protocol is used to change the attributes of a sequence of characters in display RAM 225 to a current attribute value. The protocol and the variables used for its implementation in a present embodiment are shown in FIG. 7. Rewrite attribute protocol 701 is made up of three bytes:
ESC code 604;
RWA code 703, which has the value X57
Count 705, which specifies the number of characters from the current address in display RAM 225 whose attributes are to be altered.

In a present embodiment, rewrite attribute protocol 701 is implemented as follows: in response to ESC code 604, microprocessor 201 sets State to 1; in response to State=1 and RWA code 703, microprocessor 201 sets State to 40. In response to that value of State and Count 705, microprocessor 201 sets up a loop by setting the variable Temp 713 to the value of Count 705, setting variable Wk7 715 to the value of CurAddr 629, which, as already described, contains the value of the current address in display RAM 225, and adding the constant used to derive addresses in attribute RAM 223 to the value in Wk7 715 to produce the address of the corresponding attribute in attribute RAM 223 and places that address in Wk9. The variable Atb 709 contains the current attribute. The microprocessor then enters the loop. First, it writes the value of Atb 709 to the address specified by Wk9 717, thereby setting the attribute at that address to the current attribute. Then it loads the addresses in Wk7 715 and Wk9 into register X 209, increments them, and returns them to Wk7 715. Finally, it decrements Temp 713. If Temp 713 does not equal 0, microprocessor 201 repeats the steps of the loop. The attributes of the number of characters specified in Count 705 are thereby changed to the current attribute.

D. Field and Region Shifting Protocols: FIG. 8

When a terminal is being used in an application such as word processing, it is often useful to be able to "open up" a space in the terminal display. That operation is performed in terminal 111 of the present invention by means of four protocols: shift field left, which shifts a specified field one character to the left and fills in the opened space with a specified character, shift field right, which shifts to the right but otherwise works in the same fashion, scroll up, which scrolls a specified number of lines up one line and leaves a blank line, and scroll down, which scrolls down but otherwise works in the same fashion. Each of these operations may be combined with the repeat next protocol to shift more than one character or scroll more than one line.

i. Shift Field Left 801

Shift field left 801 defines a field beginning at the cursor and extending the number of characters specified in the protocol to the right of the cursor. On completion of the operation, the characters in the field are shifted one character left. The leftmost character in the field is lost from display 113, and the empty position at the right end of the field is filled with the specified character. As shown in FIG. 8, by means of the dashed bytes, shift field left protocol 801 contains four or six bytes. The four-byte form may specify any character from the current character set or the fill character as the character to be filled into the space created by the shift. The six-byte form may specify a character from any character set as the character to be filled in. The bytes are the following:

ESC code 604;
SFL code 803, which specifies the shift left operation and has the value X4C or X6C.
Count 805 specifies the number of characters to the right of the current cursor position which are to be shifted.
Char 807 in the four-byte version specifies the character to be inserted in the space resulting from the shift. The value of Char 807 may be the code for any printable character or the display fill character protocol. In the latter case, the inserted character will be the current fill character.
ESC 604 is the fourth byte in the six-byte version.;
Chrset 808 in the six-byte version specifies the character set to be used.
Char 810 in the six-byte version specifies the character from the specified character set.

The protocol is implemented as follows: in response to the first escape code 604, microprocessor 201 sets State to 1; in response to State=1 and SFL code 803, microprocessor 201 sets State to the value 36; in response to that value and the value of Count 805, microprocessor 201 sets the variable Temp 713 to the value of Count and State to the value 37. What happens next depends on the value of the third byte.

In response to State=37 and Char 807, microprocessor 201 first stores the value of Char 807 in the variable Temp+1 822. Then it computes the address of the attribute for the character at the end of the field to be shifted by adding the value of Temp to the value of CurAddr 629 and the offset for addresses in attribute RAM 223 to that value. The resulting address is stored in Wk6. Next, Wk2 825 is set to the value of CurAddr 629, Wk3 827 is set to the address of the attribute for the character at CurAddr 629, Wk4 829 is set to the value of CurAddr 629+1, and Wk5 831 is set to the address of the attribute for the character at CurAddr+1. Thereupon, a loop is executed. Starting with the character next to the leftmost character in the field and moving to the right, each character in turn is moved together with its attribute one position to the left until the end of the field is reached. The loop is implemented like this: on each execution of the loop. the bytes at the addresses specified by Wk4 829 and Wk5 831 are first moved to the addresses specified by Wk2 825 and Wk3 827. Then Wk2 825 is set to the current value of Wk4 829 and Wk3 827 is set to the current value of Wk5 831. Finally, Wk4 829 and Wk5 831 are each incremented by one. The loop terminates when the value of Wk3 827 is equal to the value of Wk6 833, i.e.. when the attribute belonging to the rightmost character in the field has been shifted to the preceding position. When the move is finished, the character specifed by Char 807, which was stored in Temp+1, is placed at the location specified by Wk2 825 and the current attribute from Atb 709 is placed at the proper offset from Wk2 825 in attribute RAM 223. If Char 807 specifies the current fill character, the character placed in the location specified by Wk2 825 is that in Filch 623.

Continuing with the six-byte version, in response to State=37 and ESC 604, microprocessor 201 sets State to 47; in response to State=47 and Chrset 808, microprocessor 201 determines whether Chrset 808 contains one of the values for a character set, and if the value is legal, it is stored in the variable WKD 631 and State is set to 48. In response to State=48 and Chr 810, microprocessor 201 first determines whether the value of WKD 631 is different from the current value of Chrset 627. If it is, Chrset 627 is reset to the value of Chrset 627. Then the value of Chr 810 is placed in Temp+1 and microprocessor proceeds in the manner described for State=37 in the four byte variant of the protocol.

ii. Shift Field Right 809

Shift field right 809 is analogous in form and function to shift field left 801, except that the contents of the field are moved to the right instead of the left and the character specified in the protocol is placed in the field's leftmost position. As shown in FIG. 8. shift field left protocol 809 contains four or six bytes. The four-byte form may specify any character from the current character set or the fill character as the character to be filled into the space created by the shift. The six-byte form may specify a character from any character set as the character to be filled in. The bytes are the following:

ESC code 604;
SFR code 803, which specifies the shift right operation and has the value X52 or X72;
Count 805 specifies the number of characters to the right of the current cursor position which are to be shifted.
Char 807 in the four-byte version specifies the character to be inserted in the space resulting from the shift. The value of Char 807 may be the code for any printable character or the display fill character protocol. In the latter case, the current fill character is inserted in the space.
ESC 604 is the fourth byte in the six byte version.;
Chrset 808 in the six-byte version specifies the character set to be used.
Char 810 in the six-byte version specifies the character from the specified character set.

The implementation of shift field right 809 is analogous to that of shift field left 801, except that when the microprocessor executes the shifting loop, it begins at the right-most position in the field and, proceeding to the left, shifts each character in turn one position to the right. In accordance with the differing direction, Wk4 829 is set to one byte less than Wk2 825 and Wk4 and Wk5 831 are decremented on each execution of the loop.

iii. Scroll Region Up Protocol 813

Terminal 111 responds to scroll region up 813 by moving a region beginning at the line currently containing the cursor and extending upwards a specified number of lines up one line and filling the line thus opened with the current fill character. The cursor remains at the line opened by the operation and the line at the top of the region is lost from display 113. The protocol contains the following bytes:

ESC code 604;

SRU code 815, having the values X55 or X75.

Count 817, specifying the number of lines in the region

Scroll region up 813 is implemented as follows: responding to ESC 604, microprocessor 201 sets State to 1; responding to State=1 and SRU code 815, microprocessor 201 sets State to 31. In responding to State=31 and Count 817, microprocessor 201 executes a loop which, beginning at the top line in the region and proceeding downward, moves the characters in each succeeding line up one line together with their attributes. The loop is implemented in this manner: microprocessor 201 first sets the variable Temp 713 to the value specified in Count 817. Then it uses a variable called Lin 837, which always contains the number of the line in which the cursor is currently located, to compute the address in display RAM 225 of the first byte of that line and to compute therefrom the address of the last byte of that line. That address is stored in Wk6 833. Next, microprocessor uses the values of Lin 837 and Temp 713 to locate the first byte in the top line of the region. The address of that byte is stored in Wk4 829. The address of the first byte in the next line of the region is computed by adding 80 (the width of a line in display 113) to the address in Wk4 829, and that address is stored in Wk2 825. Wk3 827 is set to the address of the attribute in attribute display RAM 223 corresponding to the character specified by Wk2 825 and Wk5 831 is set to the address of the attribute corresponding to the character specified by Wk4 829. Once this set up is done, microprocessor 201 executes a loop with the following steps: first, the character at the location specified by Wk2 825 is copied into the location specified by Wk4 829. Then, the attribute at the location specified by Wk3 827 is copied into the location specified by Wk5 831. Finally, Wk2 825, Wk3 827, WK4 829, and Wk5 831 are all incremented. The loop is terminated when the address in Wk4 equals the address of the last character in the region. As mentioned above, that address was saved in Wk6 833. Upon terminating the loop, microprocessor 201 executes another loop which replaces the characters and attributes in the line specified by Lin 837 with the fill character and attributes specified by Filch 623 and Filattr 621.

iv. Scroll Region Down 819

Scroll region down 819 is analogous to scroll region up 813, except that the region extends downward from the line containing the current cursor, each line in the region is moved down one line, and the bottom line in the region is lost from the display. The form of the protocol is also analogous. The bytes are the following:

ESC code 604;

SRU code 815, having the values X44 or X64.

Count 817, specifying the number of lines in the region

The implementation, too, is analogous, except that the lines are moved beginning at the bottom of the region and are moved down. Thus, the addresses in Wk4 829 and Wk5 831 are always 80 less than the addresses in Wk2 825 and Wk3 827 and the addresses are decremented by 1 instead of incremented by 1.

E. Cursor Operations: FIG. 9

The cursor is the element which appears on display 113 to mark a location in display 113 of current interest to the user. In terminal 111, the cursor position is not specified in display RAM 225; instead, the cursor is controlled by means of special codes which microprocessor 201 inputs to CRTA 221 and CRTD 219 in display controller 217. By means of these codes, the type of cursor may be changed, the cursor may be turned on or off, and if the cursor is on, it may be displayed at a specified location in display controller 217.

Microprocessor 201 manipulates the cursor as required by cursor control protocols received from host 101. In the present invention, two of these protocols are of particular interest. They appear in FIG. 9 as cursor display recall 901 and cursor display off and save 905. Using these protocols, it is possible to turn the cursor off whether or not it was previously on or off, perform a series of operations, and restore the cursor to the state, either on or off, which it was in before the operations were performed. The capability of saving and restoring the cursor's on/off state is advantageous, since it permits the display of the cursor to be suppressed during operations which involve much cursor movement and then restored without regard to whether the cursor was on or off before the operations were performed.

i. Cursor Display Off and Save 905

Cursor display off and save 905 consists of a single byte:

CDOFS code 907, which has the value X06.

The operation is implemented as follows: in response to CDOFS code 907, microprocessor 201 copies the current on/off state of the cursor, contained in the variable CurS 911, into the variable ScurS 915 and sets the variable CurS 911 to indicate that the cursor is off. Thereupon, microprocessor 201 places codes in CRTA 221 and CRTD 219 to which display controller 217 responds by turning the cursor off.

ii. Cursor Display Recall 901

Cursor display recall 901 also consists of a single byte:

CDR code 903, with the value X14.

In response to that code, microprocessor 201 sets the variable CurS 911 to the value of the variable ScurS 915, thereby restoring the on/off status saved in response to the last cursor display off and save protocol. Thereupon, microprocessor 201 places codes in CRTA 221 and CRTD 219 to turn the cursor off or on, depending on the value of CurS 911, and if CurS 911 indicates that the cursor is to be turned on, further places codes in CRTA 221 and CRTD 219 to set the cursor to the display type specified in the variable CurTY 913. The type retained therein is set by a set cursor type protocol. In other embodiments having only a single display type, the latter operation would not be performed.

Variations involving any information about the cursor are possible. For example, cursor display off and save may save the display type as well as whether the cursor is on or off. With such a protocol, a variable which saved the current value of CurTy 913 would be required and cursor display recall 901 would restore CurS 911 from ScurS 915 and CurTy 913 from the variable in which the type was saved. In other embodiments, there might be state saving operations distinct from the cursor off operation and separate state saving and restoring operations for different components of the cursor's state. The techniques used to implement all of them would be clear to one skilled in the art from the description of cursor display off and save 905 and cursor display recall 901.

F. Key Bit Map Loading Operations: FIG. 10

In terminal 111 of the present invention, bit maps in program data RAM 231 determine which keys of keyboard 115 are affected when the shift lock key is depressed and which keys are auto-repeating, i.e., are taken to indicate that the character which they represent is to be repeated as long as the key is depressed.

Employing bit maps to define keyboard behavior in this fashion allows the keyboard to be easily tailored to the needs of different programs and users. Three protocols of the present invention, all shown in FIG. 10, permit host 101 to set the bit maps specifying which keys repeat and which are to respond to the shift lock key and to confirm whether the bit maps contain the proper contents.

i. Load Repeat Key Bit Map Protocol 1001

Load repeat key bit map protocol 1001 consists in a present embodiment of 31 or 32 bytes:
ESC code 604;
LRKM code 1003, indicating that the repeat key bit map is to be set and having the value X4A or X6A.
CSUM? code 1005, indicating whether a checksum value will follow the bit map;
28 bytes containing the new bit map;
If CSUM? 1005 indicates a checksum value, CSUM 1009, the checksum value.

CSUM 1009 is used to verify that the bit map loaded by the protocol is the same as the one which was originally sent. The checksum is a value which, when used in a computation together with the bytes of the bit map as originally sent yields a single result. If there has been no change in the values of the bit map bytes or the checksum during transmission or loading into RAM 231, then the same computation using the loaded bytes will produce the same result. Thus, validity may be checked by repeating the computation in the terminal and determining whether the checksum value is still correct.

In response to ESC code 604, microprocessor 201 sets State to 1; in response to that value of State and LRKM code 1003, microprocessor 201 sets State to 46; in response to CSUM? code 1005 and State=46, microprocessor 201 calculates the address of the byte following the last byte of the variable repeat bit map storage 1025 to which data will be written and sets the variables Count 1031 and Count+1 1033 to that address. Two 1-byte variables are necessary because the address is 16 bits long. If CSUM? 1005 specifies a checksum value, the last byte will contain that value; otherwise, the last byte will be the last byte of the bit map. After Count 1033 and Count+1 1035 have been set. microprocessor 201 sets State to 33.

In response to State=33, microprocessor 201 sets Temp 713 and Temp+1 to the address of the first byte in Repeat bit-map storage 1025. Then microprocessor 201 begins receiving bytes from bit map bytes 1007. As each byte is received, it is loaded at the address specified by Temp 713 and Temp+1 822 and the address specified by those variables is incremented. Loading stops when the address in Temp 713 and Temp+1 822 equals the address in Count 1031 and Count+1 1033. If the value in Count 1031 and Count+1 1033 indicates that no checksum was loaded, the processing required for the protocol is finished.

If the value in Count 1031 and Count+1 1033 indicates that a checksum was loaded, microprocessor 201 performs the calculations on the contents of Repeat bit map storage 1025 which are required to verify that the contents of the storage are the same as the contents of bit map bytes 1007 when they were sent from host 101. The result of those calculations is returned to host 101 in checksum return protocol 1015. As may be seen from FIG. 10, that protocol consists of the following four bytes:
Terminal response code 1017, having the value X03 and indicating that terminal 111 is returning data to host 101 in response to a protocol from host 101;
CsumS code 1019, specifying that the data being returned is the result of a checksum operation;
CsumR code 1019, specifying whether the checksum operation indicated valid or invalid data in the bit map;
Tresp Term code 1023, marking the end of the terminal response.

Microprocessor 201 returns checksum return protocol 1015 by writing the proper CsumR code 1021 for the result of the checksum operation together with the other codes required for checksum return protocol 1015 into the variable ReplyB 1029 and then outputting the bytes of return protocol 1015 from reply B 1029 to host 101. As will be explained in more detail later, the use of both TResp code 1017 and CsumS code 1019 in a present embodiment of checksum return protocol 1015 is a consequence of the general mechanism used to handle data returned from terminal 111 in response to a protocol from host 101. In other embodiments, checksum return protocol 1015 may contain only a single byte indicating both that data is being returned and the kind of data.

ii. Load Shift Key Bit Map Protocol 1011

As may be seen from FIG. 10, load shift key bit map protocol 1011 has a form which differs from that of load repeat key bit map 1001 only in LSKM code 1013, which specifies that the shift key bit map is to be loaded. In a present embodiment, LSKM code 1013 may have the values X42 or S62. The implementation of load shift key bit map protocol 1011 resembles that of load repeat key bit map 1001, the differences in the implementations being the consequence of the fact that the area in memory which is loaded in response to load shift key bit map 1011 is shift bit map storage 1027. Checksum return protocol 1015 is used in exactly the same fashion with load shift key bit map 1011 as with load repeat key bit map 1001.

G. Shift Lock Key Handling: FIG. 11

When the shift lock key on keyboard 115 is pressed, terminal 111 is placed in shift mode until the shift lock key is again depressed. While terminal 111 is in shift mode, it shifts all shiftable characters (i.e., those which are indicated as being shiftable in the shift key bit map contained in shift bit map storage 1027) before it outputs them to host 101. Terminal 111 has three ways of shifting a character:
In each shiftable character, it can set the bit which shifts the character.
It can precede each character with a shift prefix, i.e., a code indicating that the immediately following character is to be shifted if it is shiftable.

It can bracket a group of characters to be shifted with shift start and stop codes. Shiftable codes within a bracketed group are then to be shifted.

Shift processing takes place when microprocessor 201 responds to an interrupt from keyboard 115. In the first mode, when microprocessor 201 executes the interrupt code for the keyboard interrupt (in interrupt routines 252), it shifts the keystroke code before it is sent to Host 101; in the second mode, microprocessor 201 prefixes the shiftable code with a shift prefix code and sends both to Host 101; in the third mode, microprocessor 201 does not alter the transmitted code or send a prefix code, but does respond to the shift lock key by sending the shift start and shift stop codes to host 101.

In a present embodiment, the manner in which the keyboard interrupt specifies a shift is controlled by two variables shown in FIG. 11: LokTy 1107, whose value indicates the mode being used and ShiftF 1109, which indicates whether the keyboard is currently in shift mode. ShiftF 1109 is set when the shift lock key is depressed to put keyboard 115 into shift mode and cleared when the shift lock key is depressed to take keyboard 115 out of shift mode. If LokTy 1107 indicates that shifting is being done by setting a bit in the character code, then when ShiftF 1109 indicates that the keyboard is in shift mode, the keyboard interrupt routine shifts the character by setting the bit in the code; if LokTy 1107 indicates that shifting is being done by means of a shift prefix, then when ShiftF 1109 indicates that the keyboard is in shift mode, the keyboard interrupt routine precedes each character code with the shift prefix code. If LokTy 1107 indicates that shifting is being done by means of a shift start and a shift stop code, then when the keyboard is placed in shift mode, the keyboard interrupt routine sends a shift start code to host 101 and sets ShiftF 1109 to indicate the shift mode, but neither sets a bit nor adds a prefix to the characters following the shift start code. When the keyboard is taken out of shift mode, the keyboard interrupt routine sets ShiftF 1109 to indicate no shift, and if LokTy 1107 indicates the use of the shift start and stop codes, sends a shift stop code to host 101.

Which mode is used in terminal 111 at a given time to indicate that a character should be shifted is specified by means of set lock key handling mode protocol 1101, shown in FIG. 11. A present embodiment of the protocol consists of the following four bytes:

ESC 604;
STC 1103, indicating that a characteristic of terminal 111 is to be set
SLH 1105, specifying that it is lock key handling which is to be set;
LHT 1105, specifying the kind of lock key handling.

The implementation of the protocol is the following: in response to ESC 604, microprocessor 201 sets State to 1; in response to State=1 and STC 1103, microprocessor 201 sets State to 13; in response to State=13 and SLH 1105, microprocessor 201 sets State to 27; and in response to State=27 and LHT 1105, microprocessor 201 sets LokTy 1107 to specify the kind of lock key handling indicated by LHT 1105. In a present embodiment, lock key handling is only one of a variety of characteristics which may be set by protocol from the terminal. All of the protocols for setting these characteristcs begin with the two bytes ESC 604 and STC 1103; in other embodiments, these bytes may not be required.

H. The Read Terminal Attribute Protocol: FIG. 12

Read terminal attribute protocol 1201 is one of a family of protocols by means of which host 101 can receive information concerning the status of terminal 111. Read terminal attribute protocol 1201 requests the terminal to return the attribute for the character in the position currently occupied by the cursor. The terminal responds to read terminal attribute protocol 1201 by means of attribute return protocol 1207. Read terminal attribute protocol 1201 is one of a class of protocols which query the terminal. All of these protocols have the general form shown in FIG. 12, namely a code indicating a query and a code indicating the query type. Read terminal attribute protocol 1201 has the following three bytes:

ESC 604;
Q code 1203, indicating that the protocol is a query to the terminal;
RTA code 1205, indicating that the information sought is the attribute of the character at the current cursor position.

In a present embodiment, Q code 1203 has the value X3F and RTA code 1205 has the value X23. The implementation executes the protocol thus: responding to State=1 and Q code 1203, microprocessor sets State to 5; responding to State=5 and RA code 1205, microprocessor 201 uses Lin 837 and Col 835, which specify the current cursor position in terms of a line number and a column number, to compute the address of the character at the cursor position in display RAM 225. Next it computes the address of the character's attribute by adding the offset used for attributes to the address of the character at the cursor position, and fetches the attribute from attribute RAM 223. Microprocessor 201 then forms a response protocol containing the attribute in the manner described above in the discussion of the bit map setting protocols. Thereupon, the response protocol is sent to host 101.

The response protocol, attribute return protocol 1207, has the following four bytes:

TResp code 1017, indicating a response to a protocol;
CurA code 1209, indicating that the response is the attribute at the current cursor position;
Attr code 1211, indicating the attribute;
Tresp Term code indicating the end of the response.

In a present embodiment, CurA code 1209 has the value X23.

I. The General Form of the Terminal Response Protocol: FIG. 13

As may be inferred from the discussions of response protocols 1207 and 1015, terminal 111 employs a general form for protocols used to return data to host 101. General form 1301 is illustrated in FIG. 13. The response protocol always has the following components:

Tresp code 1017, indicating that the following bytes are a response to a query protocol;
RespTy code 1303, indicating the type of response;
Rdata 1305, containing the byte or bytes of data returned in the response;
Tresp Term, indicating the end of the response.

The advantage of this kind of response protocol lie in the fact that it can be handled by generalized code in host system 101. The use of generalized code to handle incoming responses is advantageous for two reasons: First, when the response arrives in host 101, it causes an interrupt and is processed by code executed in response to the interrupt. Since interrupt code is frequently executed and interrupts other processing, it is important that such code be efficient. Second, in multiprogramming systems, a process which sends a protocol requiring a response from a terminal will lose access to CPU 103 until after the response arrives. Consequently, the process executing on CPU 103 when the response arrives is never in a position to interpret the response.

Response protocols of the general form shown in FIG. 12 may be processed using response mail boxes 1219 in host memory 107. Each process using a terminal 111 has a set of mail boxes 1307 for the terminal. There is one slot in each mail box corresponding to each type of response which may be received via a return protocol. When a response protocol from a given terminal 111 comes in, the interrupt code need only place the data contained in the response protocol in the proper mail box and indicate to the process using that terminal 111 that there is a response in the mail box. When the process regains access to the terminal, it can deal with the contents of the mail box as required by the circumstances under which it sent the protocol to which the terminal responded.

The processing of a response having the form shown in FIG. 12 proceeds as follows: First, the interrupt handling code determines from TResp code 1017 that it is dealing with a terminal response. Then it uses RespTy code 1303 to determine the proper mail box in mailboxes 1307 for the process using the terminal which sent the response. Finally, it writes the bytes of data 1305 into the mail box until it encounters TResp Term 1023, to which it responds by terminating the write operation. Thus, in order to deal with response protocols of the form of general form 1213, the interrupt handling code need only know where the process's mail boxes for terminal responses are and which slot gets the data for a given response.

J. The Set High Bit Protocol: FIG. 14

As mentioned in the discussion of the protocols to which terminal 111 responds, certain protocols may contain 7-bit codes. Terminal 111, on the other hand, is capable of displaying a character set containing more characters than can be represented using 7 bits. In order to represent these characters using 7 bit codes, the present invention uses the set high bit protocol illustrated in FIG. 14. Whenever a code requires 8 bits, i.e., whenever the leftmost bit of the code is 1, host 101 precedes the code which requires all 8 bits with the set high bit protocol. Set high bit protocol 1403 is made up of a single byte:

SHB code, indicatng the set high bit operation, and having the value X04.

As was explained in the discussion of FIG. 4A, when processing bytes received from HostB, microprocessor 201 responds to SHB code 1403 by setting variable Sethb 1407. When microprocessor 201 receives next byte 1405 from HostB, it responds to next byte 1405 and SethB 1407 by setting the leftmost bit of next byte 1405 and clearing Sethb, thus providing the extra bit in next byte 1405.

K. Conclusion

The foregoing disclosure has shown how a terminal may be constructed which responds to and produces a variety of new and useful protocols and how the protocols themselves may be implemented in a preferred embodiment. As will be clear to those skilled in the art, the specific forms of the implementations described herein are dependent on the characteristics of terminal 111. In other terminals, or terminals employing other kinds of microprocessors, other implementations of the protocols described herein are possible, as are protocols which are formally different from the ones described herein but which contain substantially the same information and are responded to in substantially the same fashion by terminal 111 or host 101. In particular, the specific values of codes and variables disclosed herein are specific to the described embodiment and are intended to be purely exemplary. Thus, the present embodiments are to be considered in all respects as illustrative and not restrictive, the scope of the invention being indicated by the appended claims rather than the forgoing description, and all changes which come within the meaning and range of equivalency of the claims are intended to be embraced therein.

What is claimed is:

1. In a display device which is connected with a digital computer system, is responsive to sequential protocols received from the digital computer system, and displays sequences of characters, and in which each character is associated with an attribute defining how the character is to be displayed, means for controlling the display of the characters in the display device comprising:
(1) means for specifying a current attribute;
(2) writable attribute association means for associating each character to be displayed with its attribute:
(3) a rewrite attribute protocol specifying that the attribute associated with each character of a specified sequence of the characters be set to the current attribute; and
(4) means in the display device responsive to the rewrite attribute protocol and the means for specifying the current attribute for setting the writable attribute association means so that each character of the specified sequence is associated with the current attribute.

2. In the means for controlling the display of characters of claim 1 and wherein:

the display means includes means for specifying a given one of the displayed characters;
the rewrite attribute protocol includes a rewrite attribute code and a number of characters specifier; and
the means responsive to the rewrite attribute protocol sets the writable attribute association means so that each character of the sequence beginning with the given character and continuing for the number of characters specified by the number of characters specifier is associated with the current attribute.

3. In a display device which is connected with a digital computer system, is responsive to sequential protocols received from the digital computer system, provides sequential protocols to the digital computer system, displays characters, includes means for specifying a given one of the displayed characters, and includes writable attribute association means for associating each character to be displayed with an attribute defining how the character is to be displayed, means for reading and setting attributes comprising:
(1) a first sequential protocol which is provided by the digital computer system to the display device and which specifies that the display means return the attribute associated with the given character to the digital computer system;
(2) a second sequential protocol which is provided by the display means to the digital computer system and which specifies the attribute;
(3) means in the display device for specifying a current attribute;

(4) a third sequential protocol specifying that the attribute associated with each character of a specified sequence of a specified sequence of characters beginning with the given character be set to the current attribute; and (5) means in the display device responsive to the first sequential protocol for obtaining the attribute associated with the given character, forming the second sequential protocol using the obtained attribute, and providing the second sequential protocol to the digital computer system and responsive to the third sequential protocol for setting the writable attribute association means so that each character of the specified sequence is associated with the current attribute.

4. In a display device which is used in a digital computer system, which responds to protocols made up of sequences of codes consisting of N bits received from the digital computer system, and which employs codes having $N+1$ bits internally, means for translating a received N bit code into a $N+1$ bit code comprising:

(1) a set high bit protocol specifying that the $N+1$ bit code translated from the following N bit code is to have 1 as the most significant bit;

(2) means for retaining a set most significant bit value indicating that the most significant bit of the $N+1$ bit code translated from the next received N bit code is to have 0 to 1 as the most significant bit;

(3) means responsive to the set high bit protocol for setting the set most signficiant bit value to indicate that the $N+1$ bit code translated from the next received N bit code is to have 1 as its most significant bit; and (4) means responsive to the next received N bit code and to the set most significant bit value for setting the N least significant bits of the $N+1$ bit code translated from the next received N bit code to the value of the N bit code and, when the set most significant bit value indicates that the translated code is to have 1 as its most significant bit, setting the most significant bit of the $N+1$ bit code to 1 and setting the set most significant bit value to indicate that the $N+1$ bit code corresponding to the next received N bit code is to have 0 as the most significant bit, but when the set most significant bit value does not so indicate, setting the most significant bit of the $N+1$ bit code to 0.

* * * * *

UNITED STATES PATENT AND TRADEMARK OFFICE
CERTIFICATE OF CORRECTION

PATENT NO. : 4,733,351

DATED : March 22, 1988

INVENTOR(S) : Richard J. Peirent

It is certified that error appears in the above-identified patent and that said Letters Patent is hereby corrected as shown below:

Column 23, line 3: delete "of a specified sequence".

Column 24, line 7: "0 to 1" should read --0 or 1--.

Signed and Sealed this

Ninth Day of May, 1989

Attest:

DONALD J. QUIGG

Attesting Officer

Commissioner of Patents and Trademarks